United States Patent [19]
Freishtat et al.

[11] Patent Number: 5,945,989
[45] Date of Patent: Aug. 31, 1999

[54] METHOD AND APPARATUS FOR ADDING AND ALTERING CONTENT ON WEBSITES

[75] Inventors: Gregg S. Freishtat, Dunwoody; James K. Leitess; Michael J. Cowden, both of Atlanta, all of Ga.

[73] Assignee: Premiere Communications, Inc., Atlanta, Ga.

[21] Appl. No.: 08/824,000

[22] Filed: Mar. 25, 1997

[51] Int. Cl.[6] .............................. G06F 3/00; H04M 11/06
[52] U.S. Cl. ..................... 345/329; 345/331; 345/978; 379/102.02; 379/93.02; 707/501
[58] Field of Search ................................. 345/329, 331, 345/333, 334, 335, 978, 302; 707/501, 513, 530; 379/102.01, 102.02, 93.01–93.03, 90.01

[56] References Cited

U.S. PATENT DOCUMENTS

| | | | |
|---|---|---|---|
| 5,008,853 | 4/1991 | Bly et al. | 345/331 |
| 5,351,276 | 9/1994 | Doll, Jr. et al. | 379/93.01 X |
| 5,497,373 | 3/1996 | Hulen et al. | 345/302 X |
| 5,727,156 | 3/1998 | Herr-Hoyman et al. | 395/200.49 |
| 5,761,420 | 6/1998 | Johnson et al. | 345/331 X |
| 5,799,063 | 8/1998 | Krane | 395/200.49 |

*Primary Examiner*—Raymond J. Bayerl
*Attorney, Agent, or Firm*—Nora M. Tocups; KilpatrickStockton LLP

[57] ABSTRACT

A device for enabling users without programming backgrounds to create and modify web pages combines the telephone with interactive voice-response technology, database software, streaming audio technology and the World Wide Web, which results in a simple and easy to use interface. Without knowledge of HTML, a user can pick up a phone and revise a Web site in seconds with an audio message, graphical images, new text, Web pages or hyperlinks. The touch-tone telephone handset operates as a substitute computer keyboard, allowing the user to publish a Web site from their telephone. Other features include the ability to switch between different Web pages when a particular URL is called, manipulation of existing audio, graphics and text materials on a Web site, HREF control, the ability to change the first page of a site, date stamping of any text, graphic or audio element, and the ability to edit or synchronize Internet, Intranet and IVR content within a single call. The device includes a Computer Telephony/Internet client/server architecture, which allows users to use the TCP/IP open communication protocol to interact with the computer telephony platform. This empowers those without computer telephony hardware to design, implement and sell a wide array of computer telephony and complex Internet related applications for use with the present invention without requiring a direct connection to the computer telephony platform.

41 Claims, 12 Drawing Sheets

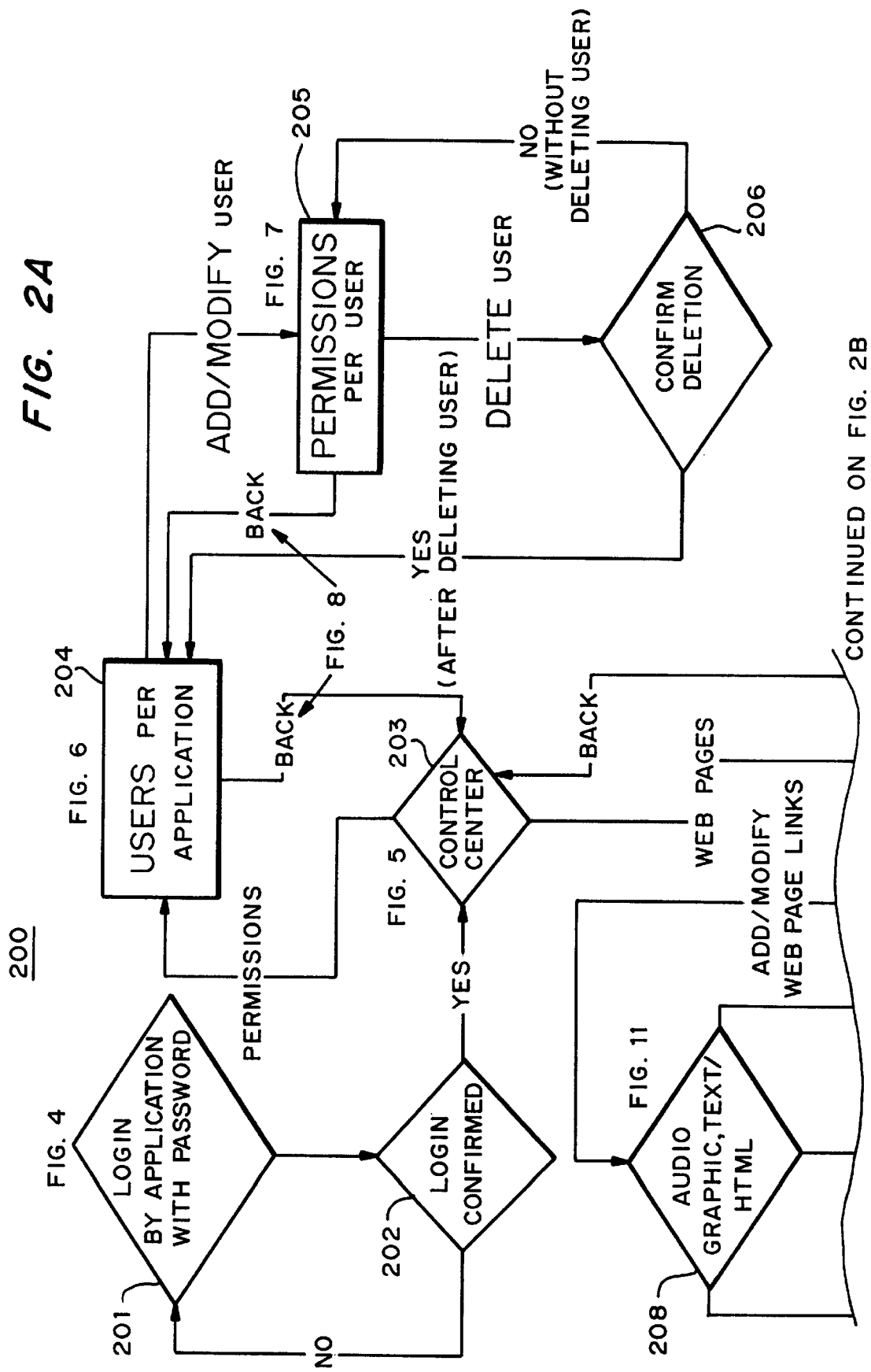

FIG. 3

Reseller Application Generator — 300

301 { WELCOME, THIS APPLICATION GENERATOR ALLOWS AUTHORIZED RESELLERS TO GENERATE AND CONTROL APPLICATIONS FOR THEIR CLIENTS. ALLOWS USERS TO UPDATE AUDIO, GRAPHICS OR TEXT ON A WEBSITE USING ONLY A TOUCH TONE TELEPHONE.

<u>Application Generator</u> — 302

303 — <u>Demos</u>   <u>Become a Reseller</u> — 304

FIG. 4

Reseller Application Generator — 401

402 { PLEASE ENTER APPLICATION NAME AND PASSWORD:
YOU MUST BE AN <u>AUTHORIZED RESELLER</u> TO USE THIS APPLICATION.

| 403 — APPLICATION NAME: | PASSWORD: — 404 |
| 405 — [            ] | [            ] — 406 |
|  | [SUBMIT] — 407 |

FIG. 5

Application XYZ Control Center } 500

Permissions – 501

CLICK HERE TO CONTROL
ACCESS PERMISSIONS
　　　　　＼
　　　　　503

Web Pages – 502

CLICK HERE TO CONTROL
WEB PAGES AND THEIR
　　　　　　　VARIABLE CONTENT
LINKS.　　　＼
　　　　　　504

FIG. 6

Application XYZ PERMISSIONS } 600

601 — TO CREATE OR MODIFY USER'S PERMISSIONS:
ENTER A NEW USER OR SELECT AN EXISTING USER BELOW.

602 — CREATE AUTHORIZED USER
603 — [                    ]  [CREATE] — 606
604 — MODIFY USER'S PERMISSIONS
605 — [ USER NAME 1  ▼ ]  [MODIFY] — 607
　　　　　　　　　(
　　　　　　　　608

FIG. 7

Permissions Profile — 700
for *user abc* — 701

702 — CREATE OR MODIFY PERMISSIONS BELOW:
703 — ONCE YOU ARE FINISH CLICK THE "SUBMIT" BUTTON.

| | |
|---|---|
| 704 — *user abc* | 713 |
| 705 — CLICK HERE TO REMOVE USER: | REMOVE USER |
| 706 — CHANGE PIN BY ENTERING A NEW PIN: | ###### 714 |
| | SUBMIT  RESET |
| | 715        716 |
| 707 — GRANT ACCESS BY CHECKING THE BOX NEXT TO THE APPROPRIATE PAGE(S) | |
| 718 / 708 — WEBPAGE 1 | ☒ — 719 |
| 709 — WEBPAGE 2 | ☒ — 720 |
| 710 — WEBPAGE 3 | ☒ — 721 |
| 711 — WEBPAGE 4 | ☒ — 722 |
| 712 — WEBPAGE 5 | ☒ — 723 |

The Permissions Profile – 801
for *user abc* — 802
has been created/modified

803 — CONTROL CENTER          CREATE/MODIFY  ⁄ 804
                              ANOTHER PERMISSION PROFILE

Enable Pages – 900
for Application XYZ

FIG. 10

Enable Pages—111

Page Properties and Content Control—112
for Application XYZ

Section I: Properties — 113

CREATE, MODIFY OR CONFIRM PAGE PROPERTIES
BEFORE COMPLETING SECTION II: — 114

| | 115 | |
|---|---|---|
| DELETE WEBPAGE: | | DELETE PAGE — 120 |
| PAGE NAME: 116 | NAME OF THE PAGE SELECTED — 121 | |
| PAGE TOUCH TONE ID: | #### — 122 | |
| FULL PATH: 118 | /USR/LOCAL/WEB — 123 | |
| HOSTNAME OF WEBSERVER: 117 | WWW.TELET.NET — 124 | |
| | CREATE/MODIFY/CONFIRM | RESET |

119    125    126

\*type\* Update Link name — 50
for \*web page abc\* —— 51
has been created/modified

| CONTROL CENTER | CREATE/MODIFY ANOTHER UPDATE LINK | CREATE/MODIFY ANOTHER WEB PAGE |
|---|---|---|
| 52 | 53 | 54 |

METHOD AND APPARATUS FOR ADDING AND ALTERING CONTENT ON WEBSITES

BACKGROUND OF THE INVENTION

The present invention relates generally to methods and apparatuses for interfacing with the Internet, and more particularly to a method and apparatus for interfacing with the Internet that permits users without programming backgrounds to add and alter content on Internet websites.

The Internet is the fastest growing information market of the twentieth century. While the exact growth rate of the Internet is often disputed, it is beyond question that the number of users on the Internet has at least doubled each year since 1992. There are presently over 30 million Internet users worldwide and at least 15 million users in the United States alone. As more and more people tap into the Internet's powerful information and communications resources, the Internet will continue to grow exponentially and generate billions of dollars of annual revenues, for those able to communicate effectively on the Internet.

One of the great attractions of publishing on the World Wide Web is the immediacy of the medium. A page of an entire Web site can be updated corrected or even completely overhauled in minutes and instantly made available to these millions of people—if one knows how to code text and images in the Hypertext Markup Language, or HTML.

While HTML coding is not a difficult skill to master, it remains one that many computer literate people have not yet learned. Certainly HTML coding remains a skill that the top executives of most companies lack. So when time-sensitive news breaks, or prices or inventory change, or a new manager is hired, these executives often find themselves facing a system every bit as slow and dependent on outside contractors as the print media. Often they have to place a call to a Web production house to get timely information to the public or employees. This can mean having to wait several hours, days or even weeks for a busy programming team to make requested changes and for an update to actually appear on the company's Web site.

This actually limits the success of a company's Internet marketing because the company cannot respond as fast as the medium, which means that in-house delays can appear as failures of Internet marketing, which can lead a company to discard its Internet marketing. When in point of fact the actual reason is that web surfers who know that a company does not update its web site frequently with new information will adapt their surfing patterns to the web site update frequency.

To hold the attention of these web surfers and to keep them returning to a company's web site at a relatively high frequency, web sites must be updated frequently. For example, a company that immediately updates its prices based on changes by its competition may be able to prevent existing customers from crossing over to the competition despite attempts by the competition to underprice it. At a minimum, the company may be able to prevent a price change announced on the Internet from having any significant effect on the market share it currently holds by essentially reducing the time period during which a price differential exists to an insignificant amount. In fact, once the competition realizes that they cannot create a price differential that has any lasting effect, they may not even attempt a price change.

The present invention is therefore directed to the problem of developing a method and apparatus for editing Web sites on the Internet that permits one to make changes to Web sites in a user friendly way without requiring detailed knowledge of Internet text and graphics programming techniques.

SUMMARY OF THE INVENTION

The present invention solves this problem by creating an interface between the HTML code and the user that is extremely user friendly and can be operated by almost any business person. The most ubiquitous of business equipment is the telephone. According to the present invention, by combining the telephone with interactive voice-response technology, database software, streaming audio technology and the World Wide Web, the present invention achieves an interface that is surprisingly easy to use, and can be accessed by almost any person without training. The end result allows people with no knowledge of HTML to pick up a phone and revise their Web site in seconds with an audio message, graphical images, new text, Web pages or hyperlinks. The result of coupling these technologies together in the manner disclosed herein is something much more powerful than the parts by themselves. With no advance planning, a user of the present invention can make a telephone call to submit a phone message that is then converted into an audio file, which can be heard seconds later on a Web page. Users who wish to add text, graphical images, new pages or hyperlinks over the phone first provide this data to the provider of this service with those materials. Once the service provider has the data, the handset on a touch-tone telephone operates as a kind of substitute computer keyboard, allowing the user to make modifications and publish a Web site from the phone keypad.

The present invention allows people with literally no programming, Internet, or computer skills to use an ordinary telephone to create, update and modify Internet and intranet Web pages and IVR based electronic resources. Before a user can begin modifying a Web site, the user must configure his application through a simple On-Line Application Generator. Once the application is setup, a phone call allows the people who control information to participate directly in the publishing of information on Web sites and Public Switched Telephone Networks (PSTNs).

The present invention offers users the ability to change graphics and add audio clips to their Web sites.

Other advantageous features of the present invention include the following capabilities: (1) the ability to switch between entirely different Web pages appearing when a particular URL is called; (2) manipulation of the location of existing audio, graphics and text materials on a Web site; (3) HREF control; (4) the ability to change the first page of a site; (5) date stamping of any text, graphic or audio element; and (6) the ability to edit or synchronize Internet, Intranet and IVR content with a single call. Virtually any type of information or object that can be stored in a database can be controlled by an authorized user using a touch-tone telephone according to the present invention.

Another advantageous implementation of the present invention empowers a Web Developer or other reseller to create and customize all aspects of the feature set of a Web site without any assistance from a technical staff. The Application Generator is fully automated and can be made available to any authorized reseller via the World Wide Web.

One advantageous embodiment of the present invention includes complete platform independence for a system operating according to the method of the present invention, which allows any reseller or content developer to create and/or modify their clients' applications, content, permissions, or other properties independent of what hardware platform or operating system on which they are working.

An object of the present invention is to create an ability to interact with standard telephony equipment using Internet Protocols. Thus, the present invention includes a Computer Telephony/Internet (CT/I) client/server architecture, which allows users of the present invention to take advantage of the TCP/IP open communication protocol to interact with the computer telephony platform used in the present invention. This CT/I architecture empowers those clients and resellers without computer telephony hardware to design, implement and sell a wide array of computer telephony and complex Internet related applications for use with the present invention without requiring them to connect directly to the computer telephony platform.

Still another advantageous embodiment of the present invention includes automatic speech recognition in combination, which reduces the need for customers to interact through the telephone keypad. This improves the ability of the system operating according to the method of the present invention to interact with users, especially those users who may have difficulty pressing the keys on their telephone keypad.

Yet another advantageous embodiment of the present invention includes a database driven Web initiated outbound calling system, WebDial, for customer support type applications. According to this aspect of the present invention, each Web site contains a WebDial link that a viewer can click on to pass data to the Web site owner. This data includes the Web page that the viewer was on, the product or service that the viewer was examining and the viewer's contact information, e.g., telephone number, email number, etc. The Web site owner then passes the contact information directly to a predetermined company representative based on the Web page and product or service, and the sales representative can then contact the viewer to close the sale. This unique feature greatly simplifies the contact procedures for a company, especially a large company with many products and services, and in combination with other aspects of the present invention, permits a company to update the contact information easily and quickly.

BRIEF DESCRIPTION OF THE DRAWINGS

FIG. 3 depicts the Reseller Application Generator page presented to the user when operating the present invention.

FIG. 4 depicts the Reseller Application Generator registration page presented to the user when accessing the present invention via the World Wide Web.

FIG. 5 depicts Application Control Center page presented to the user when operating the present invention.

FIG. 6 depicts the Application Permissions page presented to the user when operating the present invention.

FIG. 7 depicts the Permissions Profile page for a given user presented to the user during the registration process.

FIG. 10 depicts the Page Properties and Content Control page presented to the user when operating the present invention.

DETAILED DESCRIPTION

The present invention a powerful communication tool because it empowers clients to directly control their content on the World Wide Web and create a dynamic, spontaneous, constantly changing, current source of information for visitors to an Internet or intranet site. While the present invention will be described primarily in relation to the Internet and the World Wide Web, it is also applicable to intranets or other public networks that employ or could employ graphical user interfaces (GUI).

There are three primary components to the present invention: the Content Manager, the CT/I Service, and the Web publishing process. The Content Manager is a HTML/CGI Interface to the client's database of PINs, web pages, and content. It is through this interface that Web site owners configure their options that will be available to them from the telephone. Using the Content Manager, a Web site owner can permit callers to manipulate audio, graphics, text and HTML code by simply selecting the appropriate code. In addition, callers can record new voice messages that are then placed in the appropriate location on the Web site. The Content Manager also permits the Web site owner to authorize users who can modify the Web site, by assigning identification numbers and passwords to each authorized user.

The CT/I architecture is a CT application that allows the user to update their web site from the telephone. It prompts the caller for his PIN, web page, and content. The CT/I architecture creates the interface between the telephony equipment and the application that interacts with the user via the user's telephone keypad. This architecture also provides the hardware interface between the Public Switched Telephone Network (PSTN) and the main computer or server on which the application runs. In reality there are two applications running on the server, the Dispatcher that pairs the telephone channel with the appropriate application and the application itself.

Figure 2B:
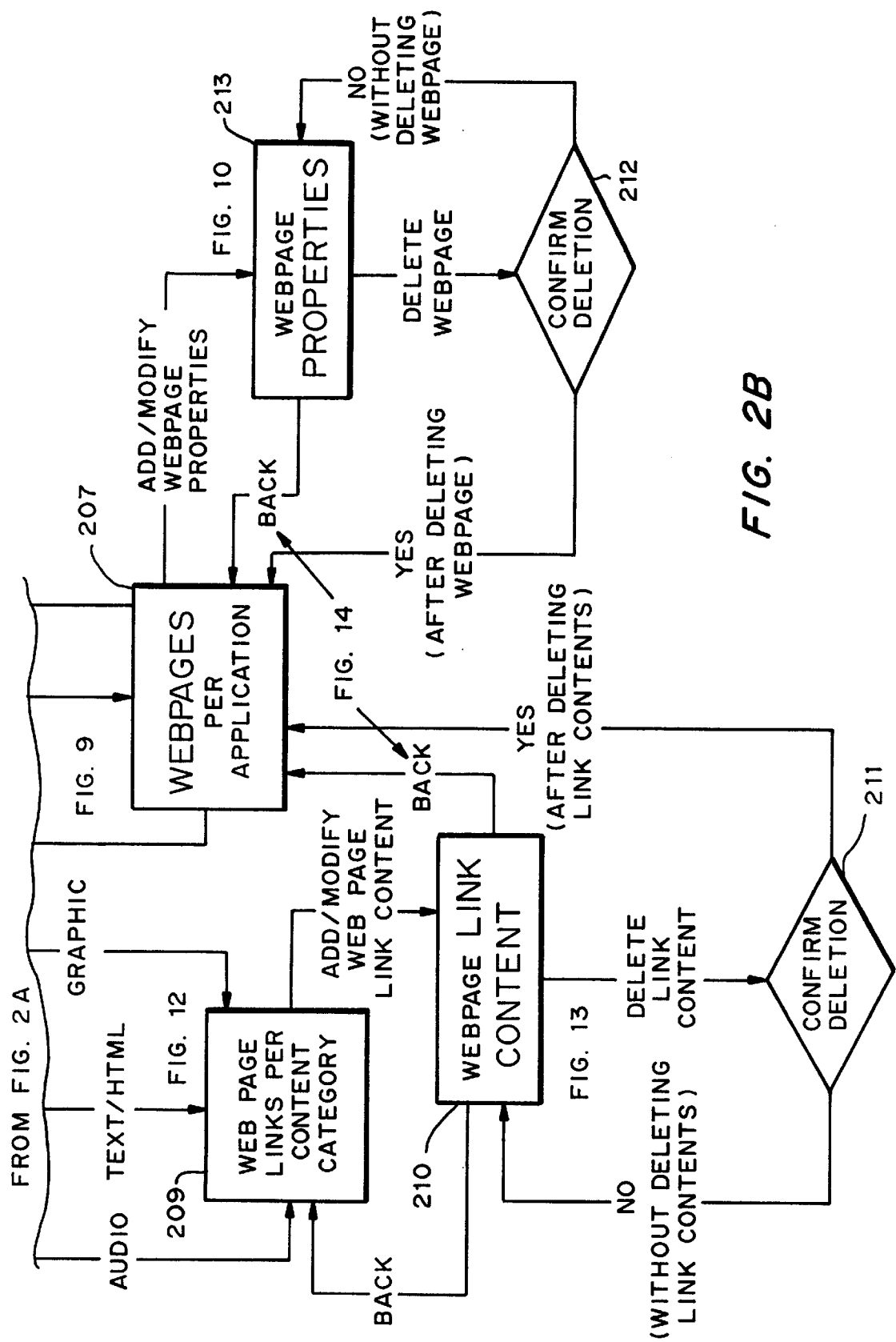
FIG. 2 depicts a call flow of the Content Manager used in the present invention.

The Web Publishing process is a client/server application that allows for the actual modification of HTML code. The server resides on the client's web server and the client resides on the service provide site—it is invoked whenever a caller telephones to perform a Web transaction according to the present invention. FIG. 2 shows the flow of a call to the Web Publisher according to the present invention.

The present invention supports all industry standard audio formats including SUN Microsystems' AU format (.AU), Microsoft's WAV format (.WAV), Progressive Networks RA format (.AU, RealAudio), and VocalTec's IWAV format (.IWAV).

According to the present invention, a typical session involves the initiating phone call, a PIN verification sequence, and subsequent DTMF responses to voice prompted selections. The present invention then accesses the application database unique to the current user and instantly updates the selected information on their Website(s) or IVR. The present invention allows the manipulation of any Web page element including graphics, audio content, interactive controls, email and fax options, time and date stamping, pre-formatted text. Voice messages are recorded, encoded and posted to the appropriate directory on the Web server, and all text and graphical operations are carried out by subroutines for file copying and editing that are defined in the application database.

According to the present invention, the On-Line Application Generator used in the present invention is a Website that clients may use to both create and modify features of the present invention on their own Websites, regardless of where their pages are stored. Through a series of registration and page design templates, the Application Generator provides all the tools necessary to generate highly sophisticated applications, even to the point of allowing customers to record voice scripts that IVR callers will hear. Full control functions available in the Application Generator of the present invention include:

- Adding or deleting target pages from the application. This allows customers to put as few or many links on their site today, without constraining future additions.
- Tagging these pages with user friendly names like "Main Page" or "Contact Page" etc. This is a Webmaster friendly naming system used in web page design due to the cumbersome path and filenames usually associated with large Websites.
- Choosing unique PINs for each element if so desired. Other enhanced security features are also possible.
- Full path name for the pages. This allows the customer to put features of the present invention on pages regardless of their location, yet sill manage the audio as a single application. Many large Websites that appear continuous are either located on different machines, or frequently, in different cities.
- Specifying webserver by host name. This feature gives clients the added flexibility of changing the machines on which their server pages are located, without having to specify Internet Protocol address numbers, e.g. Netscape can move their pages to a faster machine, and, as long as they call the larger machine by the same name, the application of the present invention works seamlessly.
- Creation and modification of audio content. Audio links can be renamed, and copyright and author information can be changed.
- Creation and modification of graphic content. Graphic elements that the present invention can control include page background, personal photographs, icons, etc.
- Creation and modification of text or HTML content.
- Creation and modification of Email links.
- Ability to switch between completely different Websites appearing for a given URL.
- Automatic 800, 900, or local phone number location.

For custom applications using the present invention, customers usually select a unique 800, 900 or local (410) phone number. Enhanced product features include all of the regular features plus:

- ANI security. Customers may designate valid phone numbers from which their personnel must update their application of the present invention. This security method is usually used in addition to the PIN process, but can be used stand-alone.
- Content transfer security. When standard FTP or RCP transfers are deemed insufficiently secure, private network transfers or authentication and encryption schemes may be implemented. In addition, private frame relay or dedicated circuits can be set up. Additionally, authentication and encryption can also be implemented using current algorithms that include, Real, PGP, etc.
- Customer controlled PIN page. Greater control over who can access the application through a password protected PIN control page is also possible.
- Web pages for interactive text changes. For non-DTMF textual updates, the present invention offers:
- Custom off-premises hardware and software solutions
- Custom applications frequently require Production personnel to work closely with network and system operators responsible for client systems; sometimes these are third parties such as ISP's or Web developers.

Content Manager

The Content Manager is a web interface to the application database used in the present invention. It allows the user to modify their permissions, web pages, and content. Through this interface the user may grant access to the Web line of the present invention through the management of pins. They may also manage their list of enabled web pages and content (audio, graphic, HTML/text).

Permissions associate a Web publisher (an individual who will use the Web line to manipulate content on their website) with a PIN. The PIN is used to authenticate these users. Without a PIN, an individual who calls the Web line of the present invention is not able to initiate a transaction according to the present invention. The Content Manager allows the user to add and delete permissions. See FIGS. 6–8.

Figure 11:
FIG. 11 depicts the Content Page for a given page presented to the user when operating the present invention.

Selecting the "Web Page" option from the Control Center (see FIG. 5) allows the user to add the present invention capability to the client's web pages. From the Web Page Control Center (FIG. 9) the user has the option of Web enabling a Web Page or modifying an already enabled page. If the user chooses to modify a page, they have the option of modifying the Web Page Properties (FIG. 10) or the Web Page Content (FIG. 11). Web Page Properties give a Web Page (host & path) a name and a touch tone ID (which will be used to retrieve this page in subsequent calls to the Web line). Web Page content allows the user to input graphics, audio, headers, text blurbs—any HTML code—into the Web Database. Each individual element (the HTML code) is given a name and a touch tone ID, just as the web pages (see FIGS. 12–13).

Referring now to FIG. 3, the initial page that is displayed to a user for the Application Generator 300 is shown. The message 301 welcomes the user to the Application Generator 300 and indicates that the user can generate and control applications for their clients (this is an example of a reseller Application Generator). Users can also update audio, graphics or text on a web site using only their touch tone phone. At this point, three options are presented to the user—Application Generator 302, Demos 303 and Become a Reseller 304. Each of these options is a hot link to another screen within the Application Generator.

FIG. 4 shows the Application Generator screen 401 presented to the user upon clicking on the Application Generator button 302 in FIG. 3. The main message 402 informs the user that the user must enter an application name 403 in the field 405 and a password 404 in the field 406. This verifies that the user is an authorized user of the Application Generator and the particular application. Once the user has entered the application name and password, the user must click on the submit button 407 to enter the next level of the Application Generator.

FIG. 5 depicts the Application Control Center for a given application. In this case, the application specified by the user in the application name field 405 in FIG. 4 was XYZ. This took the user to the Application Control Center screen for application XYZ 500. At this point, the user is presented with two options. The user may control the permissions or the web pages. By clicking on the permissions hot link 501 the user can enter the permissions page. By clicking on the web pages hot link 502 the user can enter the control web page. Messages 503 and 504 inform the user of this, respectively.

FIG. 6 shows the application permissions page 600 for the application XYZ (which is used throughout as an example). Via this page, the user may create or modify a user's permissions by entering a new user or by selecting an existing user from a list displayed on this page (see message 601). To create an authorized user, the current enters a user name in the create authorized user field 603 and clicks on the hot link "Create" 606. To modify a user's permissions, the user selects a name from the list shown in the user list field 605, which can be expanded and scrolled up and down by using the arrow key 608. Then the user clicks on the modify hotlink 607, which takes the user to the screen shown in FIG. 7.

FIG. 7 shows the Permissions profile 700 for a particular user, which in this case is "user abc" 701. Here the user can create or modify permissions. To remove the user, e.g., "user abc" 701, the current user clicks on the "Remove user" hot link 713 next to the click here to remove user message 705. To change the PIN for the user, here "user abc" 701, the current user enters a PIN in the field 714, which is masked for security reasons, and then clicks on the Submit key 715. To grant access to a web page, the current user selects a web page from the list shown in the field 718 by clicking on the X keys 719–723 next to the desired web page 708–712, respectively, and then clicking on the submit key 715. If the user enters some information but changes his mind, the user can reset the changes back to the original versions by clicking on the reset key 716 before submitting the changes.

Figure 8:
FIG. 8 depicts the message presented to the user when operating the present invention after creating/modifying a user profile permission.

FIG. 8 shows the screen displayed to the user after the permissions profile has been created or modified. The message 801 indicates that the permissions profile for "user abc" 802 has been created/modified, and presents the user with two options—return to the control center via Control Center hot link 803, which takes the user to FIG. 5, or create/modify another permission profile via the hot link 804.

Figure 9:
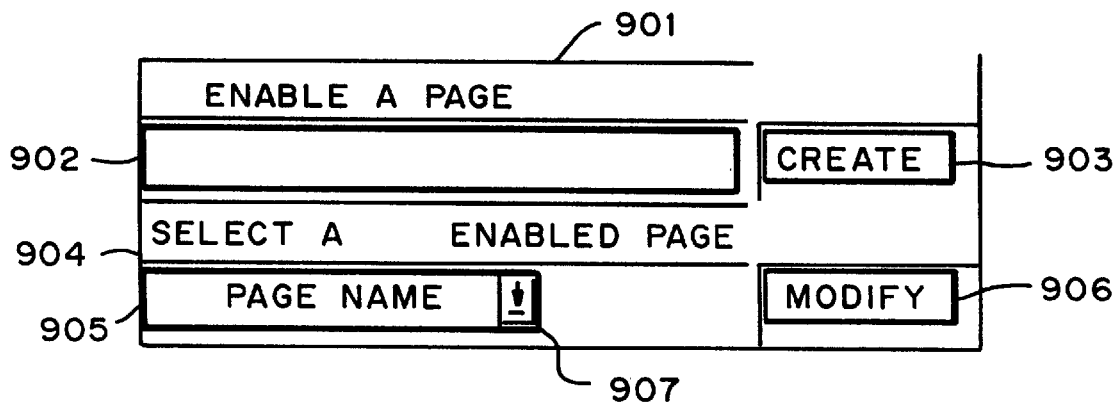
FIG. 9 depicts the Enable pages for a given application presented to a user when operating the present invention.

FIG. 9 shows the Enable Pages for a particular application screen 900 (the example application remaining XYZ) presented to the user upon clicking on the Web Pages hot link 502 in FIG. 5. To create (enable) a Web page, the user enters a name in the field 902 and clicks on the create button 903. To edit an existing Web page, the user selects the name from the page name list shown in field 905, which can be expanded by pressing the arrow key 907 and then scrolled up and down, and then clicks on the modify button 906.

FIG. 10 shows the screen presented to the user after creating a Web page by clicking on the create button 903 in FIG. 9, or selecting the modify an existing Web page by clicking on the modify button 906. In both cases, the name of the Web page appears in the field 121. Section I lists the properties of the selected Web page. These must be created before proceeding to section II in the case of a newly created Web page. The user can delete the Web Page by clicking on the delete page button 120. The user can change the touch tone identification by entering a new ID in field 122. In this case, the numbers can be masked or unmasked, depending upon the particular application. Here, the #### symbols merely represent the touch tone identification. The full path is displayed in field 123, which can also be modified. The hostname of the webserver must be entered in field 124. After entering all of the above information, the user then clicks on the create/modify/confirm button 125. The user can reset the changed field before submitting the changes by clicking on the reset button 126.

FIG. 11 shows the Section II: Content for Page ABC 90 screen presented to the user after entering the information in section I for page "ABC." Using this page, the user can create/modify several types of content in the Web page. For example, the user can change the audio via button 92, change the graphics via button 93, change the text and HTML code via button 94. The preview button 96, permits the user to preview the page 96, either before or after the changes are made. Individually, the user can preview the updates to the audio, graphics or text and HTML, via buttons 95, 97 and 98, respectively.

Figure 12:
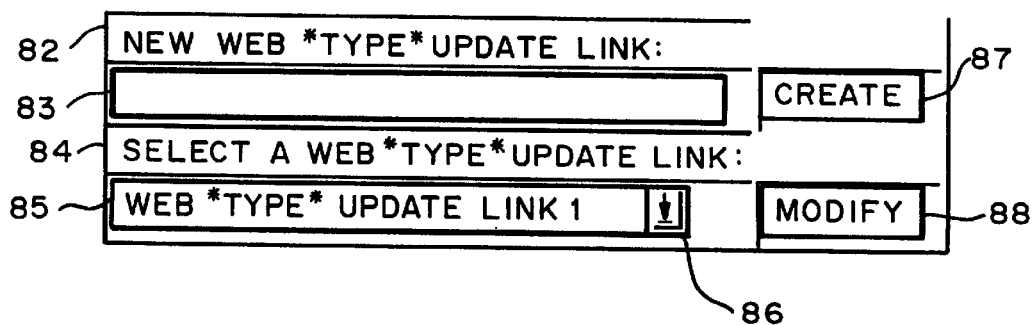
FIG. 12 depicts the Update Link page presented to the user when operating the present invention.

FIG. 12 shows the Update Link Page for the selected type, which can either be audio, graphics or text and HTML code. Depending on the type, the name of the type will be included in the title 80, and the message to the user 81. To select a new Web type, e.g., audio, update link, the user enters the name in the field 83 and clicks on the create button 87. To modify an existing update link, the user selects the name from the list in the field 85, which can be expanded and then scrolled through using the arrow key 86, and then clicks on the modify button 88.

Figures 13, 14:
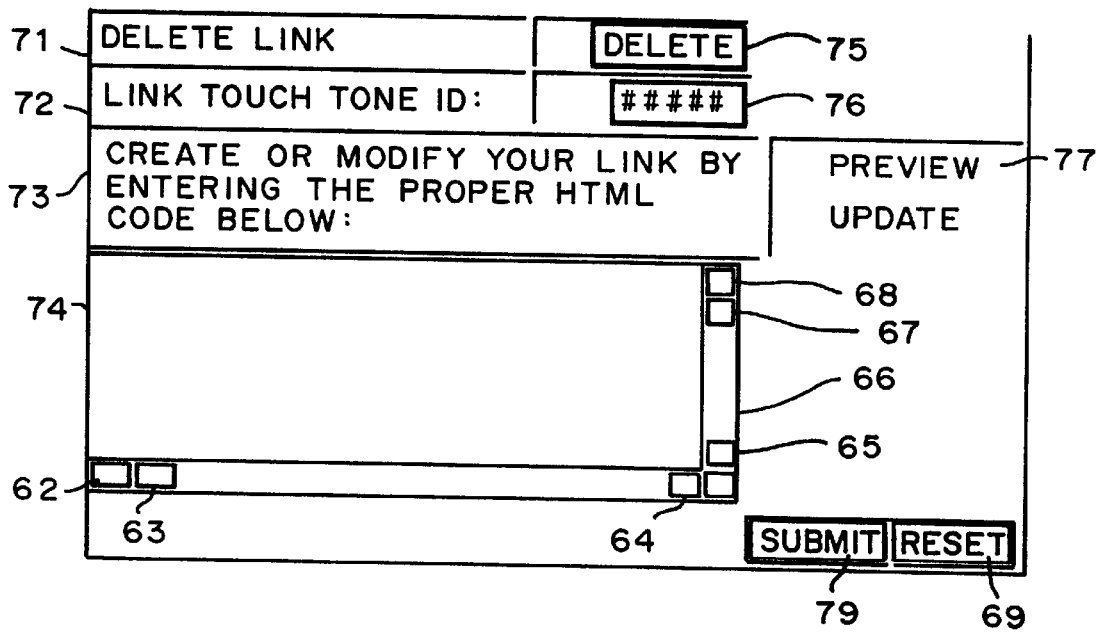
FIG. 13 depicts the Update Links name page presented to the user when operating the present invention.
FIG. 14 depicts the message presented to the user when the Update Link name for a given web page has been created/modified.

FIG. 13 shows the Update links name page 70 for the type of link chosen by the user back in page 90 (FIG. 11). To delete the link, the user clicks on the delete button 75. To change the touch tone link identification, the user enters the ID in the field 76. To create or modify the link, the user enters the appropriate HTML code in the field 74 according to the instructions 73. The scroll buttons 62–68 help the user to scroll through the HTML code. Once the HTML code is complete, the user clicks on the submit button 79. As before, the changes can be reset before submitting them by clicking on the reset button 69.

FIG. 14 shows the screen displayed to the user after the selected type of Update Link name for the selected web page 51 has been created or modified. The user is presented with three options—return to the control center 52, create or modify another update link 53 or create or modify another Web page 54.

The above process is shown in more detail in FIG. 2, which shows the flow of the Content Manager 200. First, the user logs-in to a given application using the appropriate password 201 (see FIG. 4). After login has been confirmed 202, the user is sent to the control center 203 (see FIG. 5) for the application. If login is not confirmed, the user is returned to login 201.

At the control center 203, the user can enter the users per application 204 (see FIG. 6) to edit the permissions. The user can return directly to the control center 203 from the users per application 204 (see FIG. 8). To add or modify a user, the user is passed to permissions per user 205 (see FIG. 7). The user can return directly to the users per application 204 from the permissions per user 205 (see FIG. 8). If the user wishes to delete a user, the flow passes to confirm deletion 206. If the user changes his mind about deleting a user, flow returns to the permissions per user 205, without deleting the user. If the user confirms deletion, the flow returns to users per application 204 after deleting the user.

At the control center 203, the user can choose to modify the web pages (see FIG. 9). This passes the user to the web pages per application 207.

At this point, the user has several options. First, the user can add or modify web page links, which passes control to the decision box 208 (see FIG. 11), which requests the user to indicate whether the change involves audio, graphic, or text and HTML code. Control then passes to the webpage links per content category 209 (see FIG. 12) via one of three paths, depending upon the type of change, i.e., audio, graphic or text and HTML code. To add or modify a web page link content, flow passes to the webpage link content 210 (see FIG. 13). At this point, the user can return to the web pages per application 207 (see FIG. 14). If the user wishes to delete link content, the user must confirm deletion 211. If the user answers yes, flow passes to webpages per application 207 after deleting the link contents. If the user answers no, flow passes to the webpage link content 210 without deleting the link contents.

The second option presented to the user in the webpages per application 207, is to add or modify webpage properties, which takes the user to the webpage properties 213 (see FIG. 10). The user can return directly back to the web pages per application 207 (see FIG. 14). If the user wishes to delete a web page, the user must confirm deletion 212. If the user answers no, flow passes to the webpage properties 213 without deleting the web page. If the user answers yes, flow passes to the webpages per application after deleting the web page.

The third option presented to the user in the webpages per application 207 is to return directly back to the control center 203.

CT/I Service

To update their Web site, the user will call their application's 800 number to perform the Web update. Each user is prompted for a PIN. After the caller is validated they will be asked to select a web page to update. Once the web page is selected they will be asked to select the field on the webpage in which they want to place the new content. This field is denote in the HTML on the page itself with a tag. After the user has selected the tag, the user will select what the user wants to update—audio (new or existing), graphic, or HTML code. If the user requested new audio the user will speak his or her message and confirm it. Next the content and call data (application, pin, web page, field, etc.) is passed to the publisher. See the Call Flow Diagram depicted in FIG. 2.

Since each application has its own toll-free telephone number, the CT/I service can determine which application is being called before going off hook. The CT/I service uses this information to determine the audio to play for the call. It also uses this information in every database call for the life of the telephone call to limit the range of pins, web pages, and content to those valid for the active application.

The call flow of the present invention is rather straightforward. A greeting is played to the caller. The caller is then prompted for a PIN. Once the caller's PIN has been validated, the caller is asked to select a Web page. If the caller does not know the touch tone identification for the Web page, the caller may press the star (*) key for the directory of Web pages (read with text-to-speech).

Once the caller has selected the Web page the caller wishes to update, the caller is prompted to select a field within the Web page. Fields are locations within the Web page itself, that are denoted by delimiters (see the publisher section). The caller needs to enter the touch tone identification that corresponds to the field's respective delimiter. Now the location of the dynamic content has been identified in addition to the Web page—the user may pull content from the Database by entering the touch tone identification for the content, or by entering the star (*) key for a directory of content (read with text-to-speech). The user may also press the pound (#) key if they wish to update this field with a dynamic audio link (Dynalink). The Dynalink option allows the user to record and verify the recorded message, and then select a format in which to publish the audio.

At this point the caller is read back his or her selections (WP, field, content) and may commit (publish the new content) or discard the modifications.

Publisher

Figure 1:
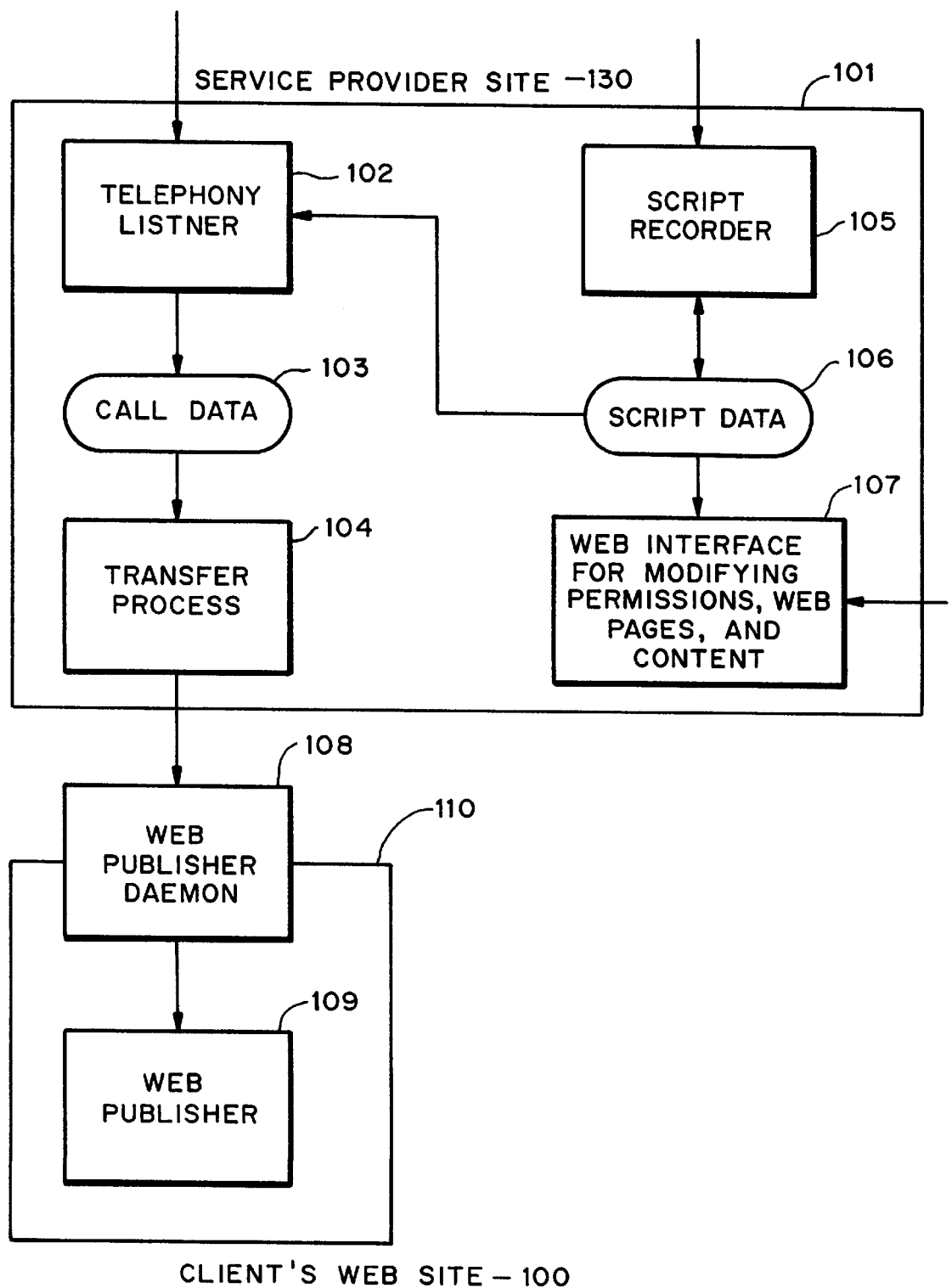
FIG. 1 depicts a block diagram of the present invention.

Referring to FIG. 1, the publisher 101 that resides on the service provider site 130 connects to the publishing server 110 that resides on the client's web server 100. It then transfers the data, and the publishing server 110 reads and rewrites the web page with the new content. Each transaction is associated with a particular application, which is passed whatever data it requires. The data is passed using the transfer process 104. The application contacts the Publishing Daemon 108 in order to initiate the changes that were indicated during the course of the transaction. The Publishing Daemon 108 resides on the client's web server 110, and services only those requests that involve the manipulation of web page content and/or the transferal of binary data, such as audio files or images.

There are two types of requests. The first is the literal substitution of HTML code inside an existing web page. No accompanying data is required at all. The second involves inserting or replacing binary data that is displayed or accessed from a client's web page. Such binary data must be transferred along with the HTML code that references it, and will often exceed the bounds of a single message across the Internet.

All requests contain the following fields:

| PIN | TYPE | WEB_PAGE_PATH | TAG |
| --- | --- | --- | --- | where PIN is the identifier of the person who invoked the application requesting the update, TYPE is either "HTML" or "binary" and indicates how to interpret the rest of the message, WEB PAGE_PATH indicates where the client's web server resides the target page to update, and TAG indicates were in the code for that page the new HTML should be inserted. TAGs are typically of the form <DWxx> where "xx" is some number. These tags are similar to conventional HTML tags, and point out to the DialWeb Publishing Daemon 108 where exactly to substitute the new HTML code.

In the case where TYPE="HTML," what follows is the literal text to be inserted into the web page. One might expect that this would be a URL to an existing web page, either local to the client or remote.

In the case where TYPE="binary," what follows is first the full pathname in which to store the binary data followed by the binary data itself. There is no limitation to the type or size of this data. Since the Dial Web Publishing Daemon 108 knows the name of the binary file as well as its server, it has enough information to construct a valid HTML link that references this file and insert it into the web document where the TAG indicates.

The Publisher 101 is accessed via the Web Interface 107 by the user when the user indicates that he wishes to modify either permissions, web pages or the content on a web page. Script data 106 is output from the Web Interface 107 to the Telephony Listner 102, converted to Call Data 103 and then transferred to the Web Publishing Daemon 108 via the Transfer Process 104.

Dispatcher

Figure 16:
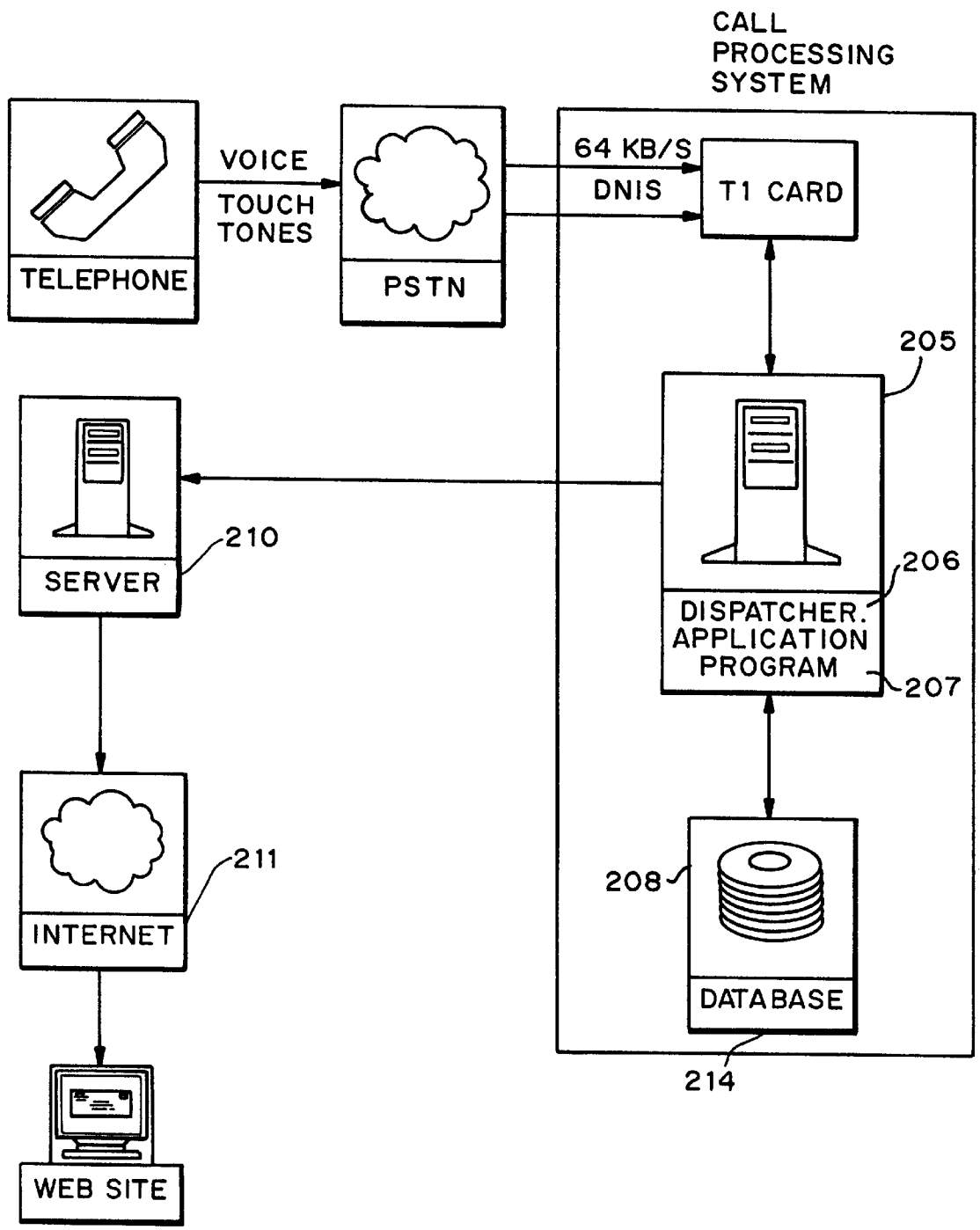
FIG. 16 shows the interface between the caller and the present invention.

Referring to FIG. 16, the dispatcher software 206 can execute multiple applications 207 per telephone call. The main function of the dispatcher program 206 is to decode the DNIS and to then pair one telephone channel with the appropriate application program 207 based on the DNIS code. The dispatcher program 206 must monitor all channels for activity, and must assign potentially several different application programs 207, depending on the DNIS. Once the dispatcher 206 pairs the channel with the application program 207, the dispatcher 206 is no longer involved in processing that telephone call, and can proceed to other tasks.

Figure 15:
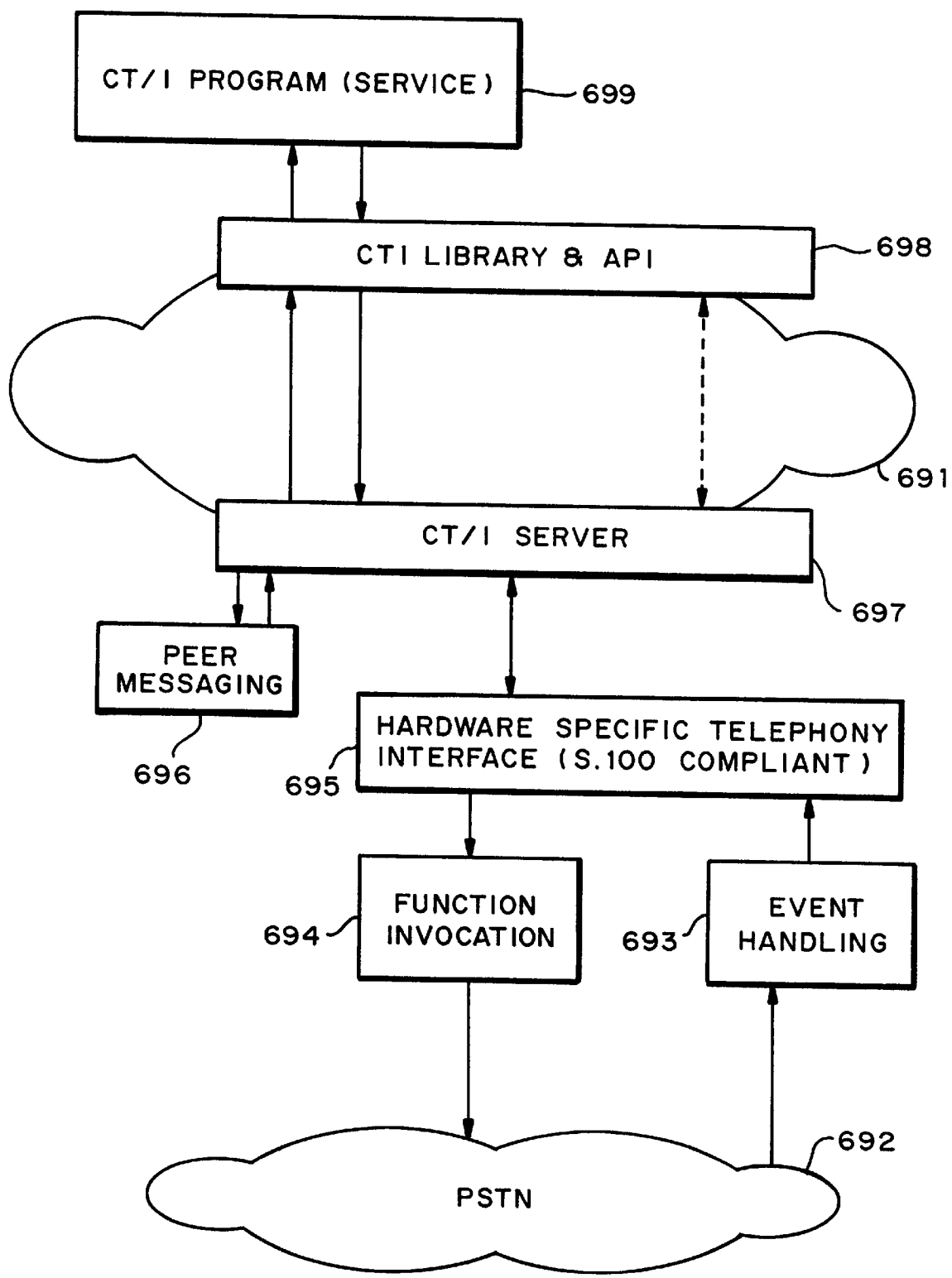
FIG. 15 depicts the interface between the computer telephony/Internet application used in the present invention.

The interaction of the Dispatcher 206 with the hardware and other applications is shown in FIG. 15. This diagram depicts a Computer Telephony/Internet (CT/I) application. In the block diagram incoming events enter the event handling 693 from the Public Telephone Switched Network (PSTN) 692 and outgoing functions enter the PSTN 692 from the function invocation 694. Both the event handling 693 and function invocation 694 interface with the Hardware Specific Telephony interface 695, which is S.100 compliant. The Hardware Specific Telephony Interface 695 connects to the CT/I Server 697. Stored on the CT/I Server 697 is a library of applications, the CTI Library and API 698. Within this library 697, is a specific CT/I Program or service 699. Peer messaging 696 occurs within the CT/I Server 697. The cloud 691 between the Server 697 and the library 698 is used to indicate that the library 698 can be downloaded from the Internet or an intranet.

The CT/I (Computer Telephony/Internet) server 697 is an S.100 compliant application, which manages telephony resources and allows multiple client applications to connect and interface with the server through a standard API. The server 697 itself is built for hardware independence. One embodiment was written on a Dialogic UnixWare Platform (Dialogic D/240SC-T1, Antares (Centigram TruVoice TTS), Gammalink CP/12SC). The server 697 transduces CT/I API functions from a registered service into functions specific to the CT system hardware/software. The server performs a similar task with respect to delivering events to the service.

The Client

The CT/I client 699, or service, uses the CT/I library 698, which resides on the local host on which the application runs. A service 699 may be transient or permanent. Transient services are applications that are invoked to perform some task, and that terminate on completion of that task. Examples of such services would be CGI script that faxes the input from a HTML form to a specific number. Permanent services are services that are always running, and which respond to events. Those events invoke some sort of action. There are a couple of examples of such services, such as a service that answers calls on a given range of DNIS values. This application can handle from 0 to the maximum number of channels worth of calls. The service starts up, initializes and registers itself, and waits for an event—an incoming call. Another example would be a process that handles all audio file encoding/conversation for a machine. This process waits for an event, an audio file that requires encoding, and responds by encoding the file.

This gets into another distinction about services. Services may or may not require the telephony resources a CT/I Server manages, it may simply perform a task for other services. And it is for this purpose that services may communicate with one another through the CT/I API with peer messages 696.

CTTP—the protocol

CTTP is the protocol through which the CT/I library functions communication with the CT/I Server 697. It stands for Computer Telephony Transport Protocol, and it is an application layer protocol, which uses TCP/IP as the transport layer protocol. The protocol itself need not be defined since the API allows for the abstraction of all communication between the CT/I Service 699 and the CT/I Server 697.

Client/Server Relationship

Each service 699 has a distinct connection to the Server 697. A server 697 may have connections to multiple client applications, a service 699 may even connect to multiple CT/I servers 697. Anything having to do with the actual connection to the server 697 is hidden from the service 699 through the API.

The client/server relationship allows for very complex and diverse CT related applications for intranets, as well as for the Internet. The model allows for resource sharing between servers on a network. It gives the application developer an abstract view of their CT/I servers 697 (as well as other servers) with disparate hardware and operating systems, as resources providing specific function and generating specific events—all handled through a single API. It allows CT/I applications 699 (the services) to run locally or remotely.

Under this architecture the CT/I server 697 is highly scaleable in that it can be a complete system unto itself for small operations—it could contain a database, web services, and call flow applications, or it may be several CT/I servers 697, all performing no other function other than managing telephony resources and outsourcing the actual applications to other machines on the network.

Services (i) Example Services:

An application that waits for an incoming fax on a predetermined 800 number, and which encodes the fax from the tiff image format to gif and posts it to the web.

A CGI script that places an outbound call, page and fax notifying the recipient of the fields filled out in the HTML form.

An E-Mail reader application with the capability to respond with an audio message to the sender.

A telephone web browser which allows you to select a URL, and which reads the corresponding document using TTS.

An audio encoding process which waits for a peer message that transfers the audio file, and then encodes the audio file into the appropriate format.

A web based Application generator written in Java that allows a user to map out a call flow and then assign that call flow to run on a specific 800 number.

(ii) Communicate between Services

The CT/I API allows services to communicate with one another using peer messages 696 This allows distributed processing which offers several advantages:

Applications 699 that control call flow can send messages to another service 699 (a helper service) to perform a function that may block (a database call for example). This keeps the call flow application in control of the call at all times, and greatly reduces latency.

Operations that take a lot of processing power or that need to run on specific operating systems can be accessed through peer messaging 696 from a call flow application running on separate machines.

Users may also extend the CT/I API to include their own functions. These functions are wrappers for peer messaging 696, which allow the user to provide their own API functions and events to their services. An example of such an extension would be the addition of a function cti_amail (email_address, audio_file) which mime encodes the audio file and attaches it to an e-mail message which is sent to the given e-mail address. This function would receive an event indicating, at a minimum, success or failure. This function actually does nothing more than send a peer message 696 to the audio mail delivery service and delivers the responding peer message 696 as an event to the calling service. In fact, standard services may also be added to the API to provide functions such as audio and graphic file encoding/conversion.

The CT/I Server 697 program forks into a Communications Server and a CT Resource Manager. The Communications Server binds to a port and listens for incoming connections. When a client program (a CT/I service) connects to the port, the Communications Server forks off a relay process that attaches the client to the CT/I Resource Manager through a pipe. When the CT/I service quits, the forked relay process also quits and returns the pipe to the Communications Server for use by another service.

The CT Resource Manager process contains the main event loop. Events from the telephony hardware spur signals to the client programs, and commands from the client programs trigger function calls to the CT hardware through the vendor specific API.

The CT/I Server 697 serves as the glue binding these two interfaces (Communications Server and the CT Resource Manager). The CT/I API (ti_* functions and events) is a hardware independent API through which the CT/I service 699 can control call flow, fax, page, etc. Each distinct CT platform (Dialogic, NMS, Conversant, etc.) has it's own set of corresponding hw_*events and related events. These function and events correspond directly to the similarly named CT/I API functions.

The CT/I API library 698 is a C library that can be compiled into a client program on any machine on the Internet, and from the remote client program can attach to the CT/I server 697 and handle a multitude of calls. The CT/I API functions are designed to be easy to use, so that client application programs can be written by programmers without specific knowledge of the intrinsic of the specific CT platform and API The ti_* functions are asynchronous and will not block, so a client program can handle multiple connections at once. Some of the CT/I API functions are listed below:

```
int *ti_initialize (name, host, port, digit_event_mode);
    char*name;
    char*host;
    int port;
    int digit_event_mode;
Description:
    ti_initialize initiates a connection to a dispatch server running on a
Dialogic host. The client must provide a string identifier name by which the
dispatcher will know the client. host is a string which identifies the host
machine, for example "dialog.tc.net". port is an integer that specifies the port
number on the host machine. digit_event_mode is an integer that specifies how
dtmf digit events are reported to the client; a value of 0 puts the connection into
immediate single-digit reporting mode. If digit_event_mode is non-zero, the
connection is put into digit-block request mode. ti_initialize returns a pointer
that is the "handle" used for further communication with the dispatch server.
Events:
    event_connect, subevent_incoming
    event_disconnect, subevent_incoming
    event_digit (if digit_event_mode is ON)
struct ti_event*ti_wait_event (conn, timeout);
    int*conn;
    struct timeval*timeout;
Description:
    ti_wait_event waits for a duration of time-out for an event. conn
specifies the handle of a Dialogic dispatch server (returned by ti_initialize). If
an event is obtained, the event structure referenced in the return value will
specify the details of the event. If no event was obtained before time-out
microseconds elapsed, a NULL pointer is returned. The event structure is
composed of a major number, a minor, and an auxiliary pointer.
Events:
    event_ring, event_connect, event_disconnect
        subevent_incoming
        subevent_outgoing
    event_digit
        subevent_dtmf, subevent_mf, subevent_pulse
            aux = digit string
    event_play_done
        subevent_maxtime
        subevent_maxsilence
        subevent_digit
    event_prompt_done
        subevent_maxdigits
        subevent_finaldigit
        subevent_maxtime
```

```
            subevent_maxsilence
                aux = digit string
        event_peer_message
            aux = message
void ti_event_timeout (conn, channel, major, timeout);
        int*conn;
        int*major;
        struct timeval*timeout;
Description:
        ti_event_timeout requests notification if, after time-out, a specific event
is not received. If the event is received before time-out, the event_timeout
request is canceled. If the event is not received before time-out, then the
specific event is generated with a minor event identifier of subevent_timeout.
conn specifies the handle of a Dialogic dispatch server (returned by
ti_initialize).
Events:
        event_*, subevent_timeout
void ti_play (conn, channel, filename, interruptable_by_digit);
        int*conn;
        int channel;
        char*filename;
        int interruptable_by_digit;
Description:
        ti_plays the audio file filename over channel. The format of the audio
file is automatically determined from either the filename extension, or the first
few bytes of the file. conn is the connection handle of a Dialogic dispatch
server (returned by ti_initialize). If interruptable_by_digit is nonzero, then the
play operation can be interrupted by a digit event. ti_stop_io( ) may be called to
interrupt the playing process.
Events:
        event_play_done, subevent_EOF
        event_play_done, subevent_digit
void ti_record (conn, channel, filename, maxtime, maxsilence, int_by_digit);
        int*conn;
        int channel;
        char*filename;
        long maxtime;
        long maxsilence;
        int int_by_digit;
Description:
        ti_record creates an audio file filename with data from channel. The
recording process continues until ti_stop_io( ) is called, or until maxtime
milliseconds have elapsed, or until maxsilence milliseconds have elapsed, or
until a digit event occurs (returned by ti_initialize). If maxtime is zero, then the
recording time is unlimited. If maxsilence is zero, then silence will not stop the
recording. If int_by_digit is zero, then a digit event will not stop the recording.
Events:
        event_record_done, subevent_maxtime
        event_record_done, subevent_maxsilence
        event_record_done, subevent_digit
void ti_prompt (conn, channel, filename, interruptable_by_digit,
max_digits, final_digit, initial_timeout, idle_timeout);
        int*conn;
        int channel;
        char*filename;
        int interruptable_by_digit;
        int max_digits;
        int final_digit;
        long initial_timeout; /*milliseconds*/
        long idle_timeout; /*milliseconds*/
Description:
        ti_prompt plays the audio file filename over channel. The format of the
audio file is automatically determined from either the filename extension, or the
first few bytes of the file. conn is the connection handle of a Dialogic dispatch
server (returned by ti_initialize). If interruptable_by_digit is nonzero, then the
play operation can be interrupted by a digit event. After the play is completed or
interrupted, a digit block of max_digits is expected. If no digits are received
after initial_timeout milliseconds, or after a special digit final_digit is received,
or after an idle (silence) time of idle_timeout milliseconds after one or more
digits were received, a digit block event is returned. ti_stop_io( ) may be called
to interrupt the prompting process.
Events:
        event_prompt_done, subevent_maxdigits
        event_prompt_done, subevent_finaldigit
        event_prompt_done, subevent_maxtime
        event_prompt_done, subevent_maxsilence
void ti_speak_string (conn, channel, text, interruptable_by_digit)
        int *conn;
        int channel;
        char *text;
```

-continued

```
    int interruptable_by_digit;
Description:
    ti_text_to_speech_string converts the string text into a voice signal
which is output over channel. conn is the connection handle of a dialogic
dispatch server (returned by ti_initialize). If interruptable_by_digits is nonzero,
then the speech can be interrupted by a digit event.
Events:
    event_speak_done
void ti_speak_file (conn, channel, filename, interruptable_by_digit);
    int *conn;
    int channel;
    char *filename;
    int interruptable_by_digit;
Description:
    ti_text_to_speech_file converts the text filename into a voice signal
which is output over channel. conn is the connection handle of a dialogic
dispatch server (returned by ti_initialize). If interruptable_by_digit is nonzero,
then the speech can be interrupted by a digit event.
Events:
    event_speak_done
void ti_stop_io (conn, channel);
    int *conn;
    int channel;
Description:
    ti_stop_io_stops all play, record, and get_digit_block operations on
channel. conn is the connection handle of a dialogic dispatch server (returned
by ti_initialize).
Events:
    (none)
void ti_hangup (conn, channel);
    int *conn;
    int channel;
Description:
    ti_hangup disconnects the call on channel. conn is the connection
handle of a dialogic dispatch server (returned by ti_initialize).
Events:
    event_disconnect, subevent_incoming
    event_disconnect, subevent_outgoing
void ti_exit (conn);
    int *conn;
Description:
    ti_exit disconnects the client from the dispatch server. conn is the
connection handle of a dialogic dispatch server (returned by ti_initialize).
Events:
    (none)
void ti_die(s);
    char *s;
Description:
    ti_die prints the error messages, prints a message, and exits the client
program abnormally with an exit value of −1.
Events:
    (none).
```

Server

The server 210 is a standard server for use with the Internet. One possible embodiment for the in-house Web Servers includes: SGI Challenge S as the primary Web server with a standby SGI Indy running IRIX 5.3 with 64 Megs RAM and a minimum two (2) 4 Gig hard drives or RAID array. Each system includes the following software: NetScape Commerce Server w/Live Wire Pro, Informix ESQL/C, Standard Internet Services.

All platforms utilize all industry standard Web Platforms, operating systems, and other pertinent software; including Windows NT Server 3.51, Linux, UnixWare, Solaria, and Irix.

The most frequented web sites in the world are largely served by the SGI Challenge S, including NetScape. This machine can handle 1500 connections per second, with excellent I/O capabilities, so it is no wonder that it is the machine of choice for web serving. In addition, SGI has put considerable effort into providing high grade support and products for multimedia services that interact through the web, which is the lifeblood of our business. SGI's largest competitor in the web serving market is Sun Microsystems. However, the Sun machines investigated could only service half the number of connections as the Challenge S, and its operating system is merely 22-bit; IRIX is a full 64-bit operating system.

The SGI Challenge S and INDY machines serve as the primary platform for Product Development. Under normal circumstances, the Challenge S performs all RealAudio and web serving. The SGI INDY is well suited as a mail server and SMTP gateway for the mail server of the present invention. In event of a fail stop, the Web servers and the Mail Servers are fully redundant and capable of warm swaps. All data on the Web server is stored on two, 4 Gig disk drives that mirror each other. These drives can be relocated as need dictates.

There are two methods of scaling the web serving system to meet greater demands. Additional Challenge (DM/L/XL) can be systematically introduced. Scaling to multiple Challenge S machines would involve some overhead in order to duplicate software across all machines as well as to evenly distribute hits among the entire set. It should be remembered, however, that NetScape serves it site over seven Challenge S machines, a system which works quite well.

Database

The CPU 205 stores all records in a database 214 maintained on the disk drive 208. Any commercial database will suffice, but one version of the database 214 is sold by Informix.

One embodiment for the database platform is as follows: a Pentium-133 running Windows NT with a minimum 64 Megs RAM and two (2) mirrored 4 Gig hard drives and an Informix Workgroup Server.

Other potential database platforms include Oracle Workgroup Server for UnixWare, Microsoft SQL Server, Microsoft Access, Fox Pro, and Minerva SQL.

Informix was chosen over Sybase and Oracle for several reasons, the most important of which is Informix's continuing commitment to providing reliable, web-based databases, as demonstrated by their recent acquisition of Illustra. Informix also provides the ability to store large binary objects in its databases, which makes it ideal for any multimedia-based system. This ability to reliably service compressed voice data entering the Terra-byte class was a significant consideration. In addition, Informix has established a close relationship with NetScape and its products.

Similar to the web servers, the database server has a warm, standby machine ready to assume its duties should the situation require. The hard drives on the database server mirror each other in real time. These hard drives can be attached to the warm standby without much trouble. In the case of a hard drive error, automatic fail over to the second hard drive would eliminate any potential loss of data.

At some point in the future, the On-Line Workgroup Server must be upgraded to the On-Line Dynamic Server, running either on a multiprocessor SGI Challenge, or DEC Alpha. Great care was taken to separate SQL code from the actual applications which use it, and to use standard methods for interfacing with the database (ESQL/C) so that a switch to a different database platform can be accomplished with ease.

IVR Platform

The following is one embodiment of the IVR used in the present invention: a Pentium Rack System running UnixWare 2.0 with 32 Megs RAM on board; two (2) 1 Gig Hard Drives; a 4 Meg mirroring Controller; two (2) Dialogic D/240SC-T1 cards; one (1) Gammalink CP-12/SC 12 Port Fax Card; two (2) Dialogic Antares Cards, sixteen (16) port Centigram text-to-speech license.

Several other factors were considered in selecting the operating system (OS) for the IVR unit. The OS must have full multitasking capabilities, as well as ease of use, robustness, and reliability. There were also communications issues to consider, such as the ease of providing and managing Internet services (TCP/IP). Clearly, DOS and Windows platforms were not adequate. This left a choice between Windows NT and some flavor of UNIX, and eventually decided upon the latter. Windows NT was a relatively new host to Dialogic hardware, and thus, several of the services desired (Centigram TTS) were unavailable on that platform. The most prominent reason for selecting UnixWare was the simple fact that the combination of the Dialogic products and the UnixWare operating system provided the system with an environment comprised of all the desired components: Centigram text-to- speech (Antares), the D/240SC-T1 card, the Gammalink CP/12SC fax board, and a known operating system (existing AT&T IVR runs UnixWare).

All IVRs are equipped with alarm boards that have the capability to notify employees in the event that any Dialogic board fails. This notification will occur via outbound calling, paging, and/or e-mail. In addition, there are two external hard drives associated with each machine, each of which mirrors the other in real time. In the event that one of the hard drives should fail, there is no loss of data, and the external hard drives can be moved to another machine.

The above configuration of hardware and software provides the ability to expand the number of IVRs to include a total of four (4) D/240SC-T1 cards, one (1) Gammalink Fax Card, and six (6) Antares cards, four (4) with text-to-speech and two (2) with VCS automatic speech recognition. Such a configuration gives one IVR the capacity to simultaneously serve up to ninety-six (96) inbound or outbound calls, twelve (12) simultaneous faxes, thirty-two (32) simultaneous text-to-speech transactions, and sixteen (16) VCS transactions. In addition, Dialogic has announced plans to release the SCx bus, an extension of the SCbus which would allow up to 16 of these systems to act as a single server. Regardless, the CT/I Client/Server relationship allows for unlimited scalability and an abstraction of VRU applications from the actual hardware.

WebDial

The present invention includes a database driven Web initiated outbound calling system, WebDial, for customer support type applications. According to this aspect of the present invention, each Web site contains a WebDial link that a viewer can click on to pass data to the Web site owner. This data includes the Web page that the viewer was on, the product or service that the viewer was examining and the viewer's contact information, e.g., telephone number, email number, etc. The Web site owner then passes the contact information directly to a predetermined company representative based on the Web page and product or service, and the sales representative can then contact the viewer to close the sale. This unique feature greatly simplifies the contact procedures for a company, especially a large company with many products and services, and in combination with other aspects of the present invention, permits a company to update the contact information easily and quickly.

For example, a user surfing the World Wide Web views an Insurance company's Website, and sees information on an insurance policy in which she may be interested, and clicks on the WebDial link. This action initiates a data transmission of the page and product the customer was looking at the to the exact customer support sales representative for the Insurance company. The customer sales representative can then contact the potential client. By utilizing this feature of the present invention, much time and data transfers are saved. By transmitting the product that the customer was viewing to the Insurance company, the Insurance company can match the customer with the proper sales representative without wasting the Customer's time and hence losing the Customer due to impatience.

What is claimed is:

1. An apparatus for modifying an existing graphical user interface on a computer network comprising:

a) an integrated voice response system for receiving a telephone call from a user and interacting with the user via a telephone keypad of the user;

b) a first graphical user interface on said computer network for interfacing with the user to enable the user to define a type of content of the existing graphical user interface with the type having a corresponding link with an identification;

c) an application program on said computer network interacting with the integrated voice response system by accepting commands from the user via the telephone keypad, the commands including the identification for the corresponding link to the type of content the user desires to modify, and the application program modifying the existing graphical user interface according to the commands from the user including modifying the type of content the user desires to modify in the existing graphical user interface by using the corresponding link having the identification as provided by the user via the telephone keypad.

2. The apparatus according to claim 1, wherein the application program further comprises a content manager performing the following steps:
   (1) verifying a user login;
   (2) after verifying the user login, passing control to a control center;
   (3) enabling the user, from the control center, to modify a name and a password for authorized users, where the authorized users are those users authorized to make changes to the existing graphical user interface;
   (4) enabling the user from the control center to select a web page modification screen, which offers the user a choice of modifying a web page property or modifying a web page link;
   (5) upon the user selecting the choice of modifying the web page link, offering the user a category within the selected web page link to modify; and
   (6) upon the user selecting the category within the selected web page link to modify, enabling the user to modify the category within the selected web page link.

3. The apparatus according to claim 2, wherein said category further comprises either audio, graphics, text or HTML code.

4. The apparatus according to claim 3, wherein said category includes video.

5. The apparatus according to claim 2, wherein said content manager requires the user to confirm any deletion before deleting.

6. The apparatus according to claim 5, wherein said content manager enables the user to return to the control center after selecting a deletion but upon responding no to a deletion confirmation request without performing the deletion.

7. The apparatus according to claim 1, wherein said integrated voice response system further comprises a computer telephony interface architecture.

8. The apparatus according to claim 7, wherein said computer telephony interface architecture comprises:
   a) a hardware interface to the public switched telephone network receiving events and outputting functions;
   b) a server being coupled to the hardware interface, and having a database on which a library of applications is stored, wherein said library includes said application program, said server pairing events with particular applications within the library of applications depending upon the event;
   c) peer messaging capability for passing information between applications using IP protocols.

9. The apparatus according to claim 8, wherein said hardware interface is S100 compliant.

10. The apparatus according to claim 9, wherein said hardware interface comprises a T1 card.

11. The apparatus according to claim 8, wherein said server pairs an incoming event with a specific application within the library of applications based on the dialed number information within the event.

12. The apparatus according to claim 1, wherein the first graphical user interface enables the user to modify a name and/or a password for authorized users, where the authorized users are those users authorized to modify the existing graphical user interface.

13. The apparatus according to claim 1, wherein the first graphical user interface enables the user to modify a property of the existing graphical user interface.

14. The apparatus according to claim 13, wherein the property comprises a name of the existing graphical user interface, an interface identification for the existing graphical user interface, a full path to the existing graphical user interface, or a host name of the existing graphical user interface.

15. The apparatus according to claim 1, wherein the first graphical user interface enables the user to modify a link of the existing graphical user interface.

16. The apparatus according to claim 1, wherein the first graphical user interface enables the user to select the type of content and to modify the corresponding link of the existing graphical user interface.

17. The apparatus according to claim 1 wherein the identification comprises a dual tone multi-frequency (DTMF) identification that may be entered by the user via the telephone keypad.

18. An apparatus for interfacing with a web site on the Internet comprising:
   a) a call processing system for receiving calls from a plurality of users and assigning an application to a particular telephone call based on an incoming telephone number;
   b) a web site content manager for interacting with a user to enable the user to define a type of content on the user's web site with the type having a corresponding link with an identification; and
   c) a web site editor for interacting with the user via a telephone to receive the identification for the corresponding link to the type of content the user desires to modify and to enable the user to edit the type of content the user desires to modify on the user's web site via the telephone by using the corresponding link having the identification as provided by the user via the telephone keypad.

19. The apparatus according to claim 18, wherein the web site content manager performs the following steps:
   (1) verifying a user login;
   (2) after verifying the user login, passing control to a control center;
   (3) enabling the user, from the control center, to modify a name and a password for authorized users, where the authorized users are those users authorized to make changes to the user's web site;
   (4) enabling the user from the control center to select a web page modification screen, which offers the user a choice of modifying a web page property or modifying a web page link;
   (5) upon the user selecting the choice of modifying the web page link, offering the user a category within the selected web page link to modify; and
   (6) upon the user selecting the category within the selected web page link to modify, enabling the user to modify the category within the selected web page link.

20. The apparatus according to claim 19, wherein said category further comprises either audio, graphics, text or HTML code.

21. The apparatus according to claim 19, wherein said content manager requires the user to confirm any deletion before deleting.

22. The apparatus according to claim 21, wherein said content manager enables the user to return to the control center after selecting a deletion but upon responding no to a deletion confirmation request without performing the deletion.

23. The apparatus according to claim 19, wherein said category includes video.

24. The apparatus according to claim 18, wherein said call processing system further comprises a computer telephony interface architecture.

25. The apparatus according to claim 24, wherein said computer telephony interface architecture comprises:
   a) a hardware interface to the public switched telephone network receiving events and outputting functions;
   b) a server being coupled to the hardware interface, and having a database on which a library of applications is stored, wherein said library includes said application program, said server pairing events with particular applications within the library of applications depending upon the event;
   c) peer messaging capability for passing information between applications using IP protocols.

26. The apparatus according to claim 25, wherein said hardware interface is S100 compliant.

27. The apparatus according to claim 25, wherein said server pairs an incoming event with a specific application within the library of applications based on the dialed number information within the event.

28. The apparatus according to claim 25, wherein said hardware interface comprises a T1 card.

29. The apparatus according to claim 18, wherein the web site content manager enables the user to modify a name and/or a password for authorized users, where authorized users are those users authorized to make changes to the user's web site.

30. The apparatus according to claim 18, wherein the web site content manager enables the user to modify a property of the web site where the property may be a name of the web site, an interface identification for the web site, a full path to the web site, or a hostname of the web site.

31. The apparatus according to claim 18, wherein the web site content manager enables the user to modify a link of the web site.

32. The apparatus according to claim 18, wherein the web site content manager enables the user to select the type of content and to modify the corresponding link of the web site.

33. An apparatus for creating and modifying a web site on a public computer network, comprising:
   a) a content manager having a database storing a plurality of personal identification numbers, a plurality of web pages and a plurality of content, wherein a user can establish a personal identification to an associated content for each web page, the personal identification being used in editing the associated content of a web page;
   b) a web publisher that interfaces with the user via a telephone and enables the user to select a particular web page and add or delete content from the particular web page based on commands entered from a telephone keypad of the user, wherein said commands include the personal identification for the associated content for the particular web page and said web publisher modifies the associated content for the particular web page based on said commands from the user; and
   c) a computer telephony interface application that matches a telephone call from the user with the web publisher depending upon the telephone number the user dialed.

34. A method for enabling a user to manipulate data underlying a web site using a telephone, comprising:
   a) providing a graphical user interface through which the user can create data sets related to elements displayed on the web site;
   b) associating a code respectively for each of the elements displayed on the web site;
   c) processing a telephone call from an authorized user;
   d) pairing a content manager application with a telephone channel on which the telephone call of the authorized user was received;
   e) causing the content manager application to interact with the authorized user by providing voice prompts and by processing tones received in reply to the voice prompts as responses from the authorized user so as to accept commands from the user, the commands including the code respectively for the each of the elements displayed on the web site the user desires to modify, and causing the content manager application to modify the elements of the web site according to the commands from the user.

35. The method according to claim 34, further comprising:
   f) enabling the authorized user to replace an element displayed on the web site by entering an associated code for the element and by selecting a new element by entering a replacement code using a keypad on the telephone.

36. The method according to claim 34, further comprising:
   f) recording an audio recording from the authorized user received via the telephone; and
   g) replacing a link on the web site with a replacement link to the audio recording.

37. The method according to claim 34, further comprising:
   f) replacing a link on the web site with a replacement link to a new data set based on commands entered by the authorized user using a telephone keypad.

38. A device for updating an existing World Wide Web site, comprising:
   a) means for interacting with a user over a telephone to establish that the user is authorized, to determine features of the World Wide Web site the user desires to update by receiving from the user over the telephone a code corresponding respectively to each feature of the World Wide Web site the user desires to update, and to receive commands from the user with respect to updating the each feature; and
   b) means for interfacing with the World Wide Web site to update the each feature based on the commands from the user.

39. The device according to claim 38, further comprising:
   means for recording an audio signal received from the means for interacting; and
   means for replacing a link on the web site with a replacement link to the audio signal.

40. The device according to claim 38, further comprising:
   means for enabling the user to associate displayed features and non-displayed features of the World Wide Web site with codes corresponding respectively to the displayed features and the non-displayed features.

41. The device according to claim 40, wherein said displayed features and said non-displayed features include audio, voice, graphic, video, animation, HTML code, or text.

* * * * *